H. SATTERWHITE.
Toe-Weight for Horses.
No. 200,669. Patented Feb. 26, 1878.
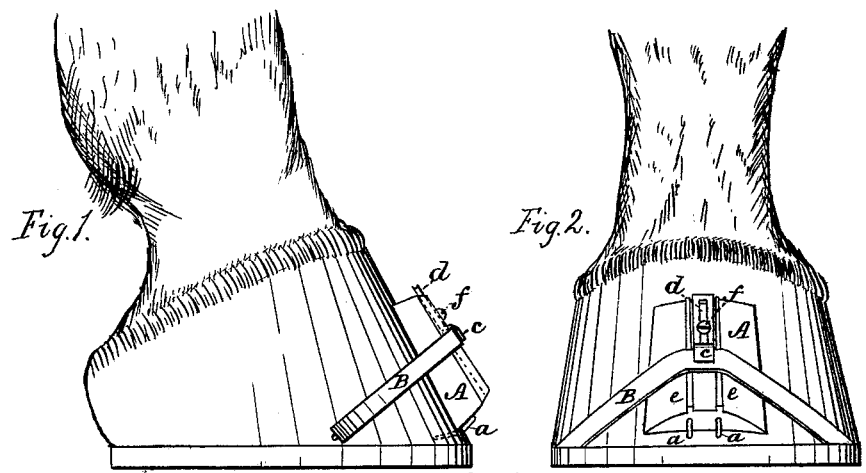
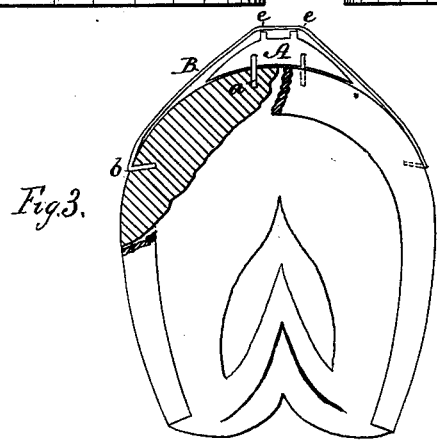
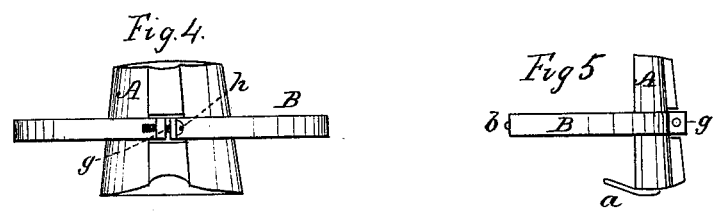
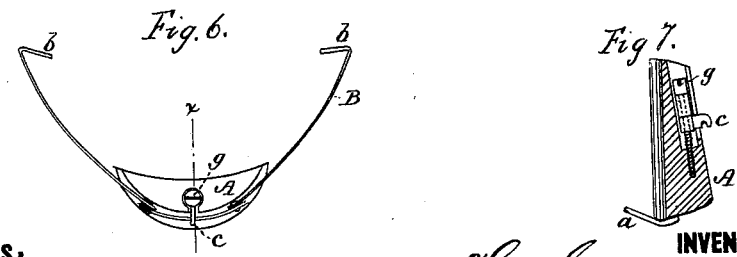
WITNESSES:
A. B. Robertson.
Edw. W. Byrn.
INVENTOR:
H. Satterwhite
BY
ATTORNEYS.

UNITED STATES PATENT OFFICE.

HARVEY SATTERWHITE, OF MARTINSVILLE, INDIANA.

IMPROVEMENT IN TOE-WEIGHTS FOR HORSES.

Specification forming part of Letters Patent No. 200,669, dated February 26, 1878; application filed January 26, 1878.

*To all whom it may concern:*

Be it known that I, HARVEY SATTERWHITE, of Martinsville, in the county of Morgan and State of Indiana, have invented a new and Improved Toe-Weight; and I do hereby declare that the following is a full, clear, and exact description of the same, reference being had to the accompanying drawing, forming part of this specification, in which—

Figure 1 is a side, Fig. 2 a front, and Fig. 3 an under-side, view, partly in section, of a horse's hoof having my improved toe-weight applied thereto. Figs. 4 and 5 are, respectively, a front and side view of a modification of my invention; and Figs. 6 and 7, a top and sectional view of a further modification.

My invention relates to an improvement in toe-weights, for regulating and rendering more uniform the gait of trotting horses.

The improvement consists, generally, in a metallic band, having hooks at its extremities, which enter holes in the horse's hoof upon the sides, combined with a toe-weight, having two spurs at the bottom, which enter the horse's hoof at the front, the same being connected with said band, and the latter adjusted and tightened to hold the toe-weight firmly to the hoof independently of any connection with the shoe, and without the use of an encompassing-band encircling the rear and tender portion of the horse's hoof.

In the drawing, A represents the toe-weight, and B the metallic band, the same being shown applied to a horse's hoof. Said toe-weight is made of metal, or other sufficiently weighty material, in the general form of a keystone, and is provided with two spurs, *a a*, at the bottom, which enter holes in the horse's hoof immediately above the shoe. These spurs hold the toe-weight in its proper vertical position, and prevent any up-and-down motion of the same upon the hoof. The band B is provided with hooks *b* at its extremities, which hooks enter holes in the sides of the hoof, and constitute a hold or purchase for the same, when the band is tightened upon the toe-weight. This tightening of the band is effected by means of a vertically-adjustable slide or hook, *c*, which is made to force the band down upon the thicker portion of the toe-weight. The means of thus adjusting the hook or slide *c* may be either that shown in Figs. 1 and 2, or in Figs. 6 and 7. In Figs. 1 and 2 the hook is formed upon a slotted plate, *d*, sliding between guides *e e*, and held to its adjustment by a set-screw, *f*, while in Figs. 6 and 7 the hook is made narrow, and projects through a vertical slot in the block, from a channel in the same, containing a screw, *g*, which screw passes through a swiveling-block carrying the hook, and, when turned, moves the hook down to tighten the band.

Instead of using a continuous band I may make the same in sections, permanently pivoted together, as shown in Fig. 6. I may also still further modify my invention by dividing the band in the center, as in Figs 4 and 5, and forming lugs *g* upon the middle ends thereof, which are united and tightened by a set-screw, *h*. When this divided band is employed the toe-weight is made with lugs above and below, and a depression in the middle to hold the band in proper position.

I do not claim, broadly, a toe-weight having the spurs, as a tongue has been used in the place of said spurs to produce a similar result. Neither do I claim the fastening and tightening of the middle ends of the band by a screw, as this has also been done before.

When, however, a band, B, (whether divided in the center or not,) is provided with hooks at its extremities adapted to enter the side of the hoof, and such band is combined with a toe-weight having the spurs *a*, it will be seen that a secure and durable connection is obtained, possessing the following advantages: First, it is entirely independent of any connection with the shoe, and hence it is equally applicable to horses which are barefooted as those which are shod; and if the shoe should become loose the toe-weight does not become loose with it, so that its connection is in no wise impaired. Again, the hooks upon the ends of the bands obviate the necessity of encircling and binding the rear and tender portion of the horse's foot, as is the case when a strap is passed entirely around the same.

Having thus described my invention, what I claim as new is—

1. The band B, having hooks at its extremities, and the toe-weight, having spurs or projections at the bottom, combined and arranged to be secured and tightened upon the horse's hoof, substantially as described.

2. The combination, with a continuous or inseparable band, having hooked extremities, of a toe-weight having spurs or projection $a$ and a vertically-adjustable hook or slide for tightening the band, substantially as described.

3. The slotted adjustable plate $d$, provided with a projecting hook, combined with the toe-weight, having guides $e$ and set-screw $f$, and with the band B, substantially as described.

The above specification of my invention signed by me this 11th day of January, A. D. 1878.

HARVEY SATTERWHITE.

Witnesses:
W. E. McCORD,
A. E. GRAHAM.